E. E. HUFFMAN AND O. W. COWGILL.
DEPTH INDICATING DEVICE.
APPLICATION FILED DEC. 4, 1917.

1,332,341.

Patented Mar. 2, 1920.

WITNESS
W. A. Alexander.

INVENTORS
E. E. Huffman
Orph W. Cowgill
by E. E. Huffman
ATTORNEY.

UNITED STATES PATENT OFFICE.

EDWIN E. HUFFMAN AND ORPH W. COWGILL, OF ST. LOUIS, MISSOURI; SAID COWGILL ASSIGNOR OF HIS RIGHT TO NEW STANDARD ADDING MACHINE COMPANY, OF ST. LOUIS, MISSOURI, A CORPORATION OF MISSOURI.

DEPTH-INDICATING DEVICE.

1,332,341.     Specification of Letters Patent.     Patented Mar. 2, 1920.

Application filed December 4, 1917. Serial No. 205,287.

*To all whom it may concern:*

Be it known that we, EDWIN E. HUFFMAN and ORPH W. COWGILL, citizens of the United States of America, residing at the city of St. Louis, State of Missouri, United States of America, have invented a certain new and useful Depth-Indicating Device, of which the following is such a full, clear, and exact description as will enable any one skilled in the art to which it appertains to make and use the same, reference being had to the accompanying drawings, forming part of this specification.

Figure 2:
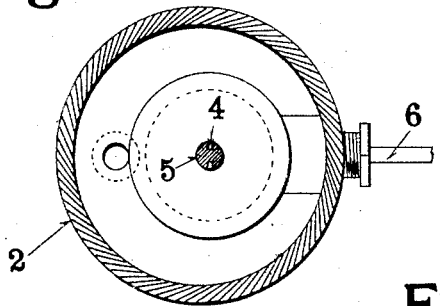
Figure 1:
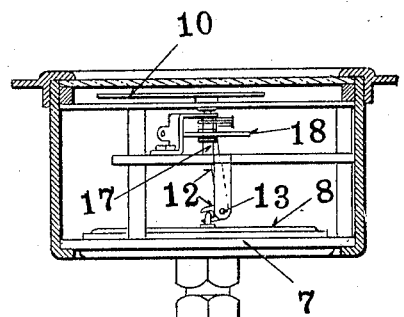
Figure 1:
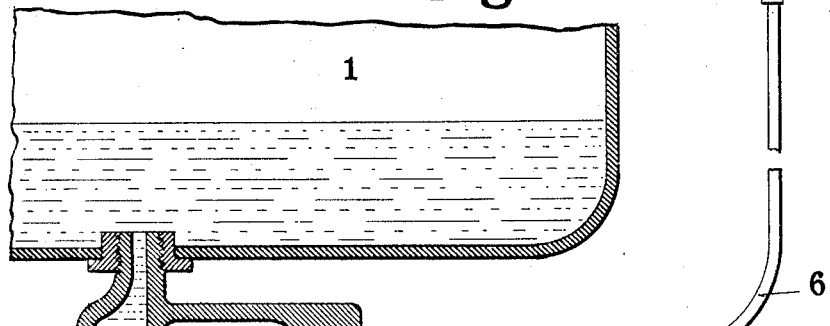
Figure 3:
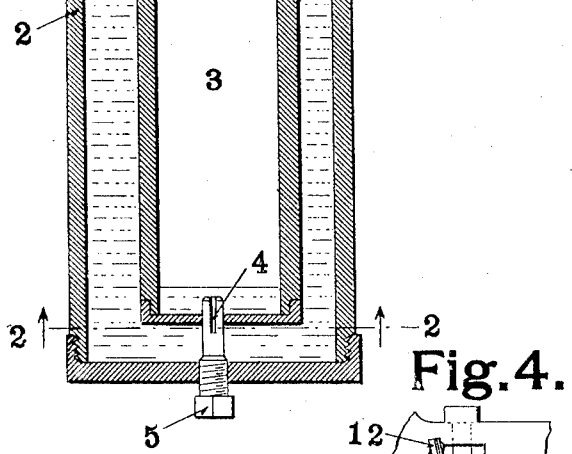
Figure 4:
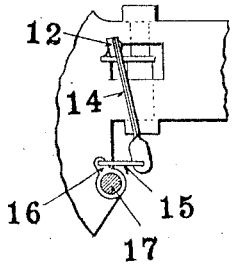

Our invention relates to means for indicating the depth of liquid in containers, such, for example, as the fuel tanks of automobiles, and is of the type in which the depth is indicated by means of a flexible diaphragm, which is subjected to a pressure varying with the depth of the liquid, the position of the diaphragm under the varying pressure being shown by suitable indicating mechanism. Among the objects of our invention are to provide an apparatus of the type described in which the diaphragm will be subjected to a certain amount of pressure when the liquid container is empty; and to so arrange the portion of the apparatus immediately connected to the liquid container that it may serve as a drain for the container and may be installed by inserting it in the drain opening with which most liquid containers, and particularly the fuel tanks of automobiles, are provided. A further object is to provide simple and convenient means for reestablishing at will the conditions existing in the depth indicating apparatus at the time of installation, without disturbing any of the connections of the apparatus. Other objects and advantages will appear from the following more detailed description:

In the drawings, which illustrate one embodiment of our invention, Figure 1 is a view partly in section and partly in elevation, showing our improved apparatus in operative relation with a liquid container; Fig. 2 is a cross-sectional view along the line 2—2 of Fig. 1; Fig. 3 is a top elevation of the pressure indicating instrument " or gage " shown in Fig. 1, a portion of the case of the instrument being broken away to show a part of the upper surface of the flexible diaphragm; and Fig. 4 is a view of a portion of the gage mechanism.

1 represents a liquid reservoir, such as the fuel tank of an automobile, and 2 a small auxiliary liquid container, communicating, as shown, with the bottom of the reservoir 1. 3 represents an air chamber, which extends to a point near the bottom of the auxiliary container 2 and communicates therewith through a groove or passage 4 in the plug 5. This air chamber is connected by means of a small tube 6 to the air chamber of the gage which is formed by plate 7 and a corrugated flexible diaphragm 8 having its edge soldered or otherwise suitably attached to the plate. The auxiliary container and walls of the air chamber 3 may be formed in a single casting as shown. The tube 6 is preferably of copper or other material which can be easily bent and the diaphragm is of resilient material, such as German silver.

In the operation of the apparatus, the liquid from reservoir 1 fills the auxiliary container 2 and enters the chamber 3 until it reaches the level at which the pressure of the air in the air confining portions of the apparatus, of which this chamber is a part, equals the pressure resulting from the difference of level between the liquid in the reservoir 1 and the liquid in the chamber 3. The air pressure bends the flexible diaphragm 8 at its central portion and, through suitable multiplying mechanism, the motion of the central portion of this diaphragm is communicated to the indicating pointer 10, operating over a dial 11 which may be graduated to indicate either the depth or the quantity of liquid in the reservoir 1. The capacity of the air chamber 3 is a large per cent. of the capacity of the entire air confining parts of the apparatus to minimize the effect of temperature changes upon the operation of the device, as explained in United States Patent No. 1,246,270.

In the form illustrated the multiplying mechanism comprises a lever 12 pivoted at 13 and having its short arm engaging with a stud secured to the center of the diaphragm 8, To the end of the long arm of lever 12 is rigidly attached a compensating element 14, comprising two strips of metal of different coefficients of expansion welded or otherwise fastened together, and operating to compensate for the effect of temperature changes as fully described in the Patent No. 1,246,270, just referred to. This element 14 connects the end of the lever 12 with the indicating pointer 10 through a link 15 and a lever 16 which is connected to a shaft 17 supporting the pointer. The spring 18 is secured at one end to the supporting frame for the pointer shaft and at the other to said shaft and serves to take up any "lost motion" in the various connections of the multiplying mechanism.

When it is desired to remove any sediment that may collect in the bottom of the auxiliary tank 2, the plug 5 is removed and the sediment will be carried out by the escaping liquid. It will also be noted that the removal of the plug 5 leaves a comparatively large opening in the bottom of the chamber 3, and this also permits the liquid to drain out of this chamber. Consequently, if an instrument does not make correct indications of depth on account of faulty installation, such as allowing liquid to be in the chamber 3 at the time of connecting the tube 6 to the instrument and to this chamber, or making of imperfect connections between the tube and the chamber or the instrument which permit the escape of air, the defect may be removed and proper conditions established in the chamber 3 without disconnecting the auxiliary container from the reservoir 1.

The purpose of the small opening 4 from the liquid container 2 into the chamber 3 is to restrict the rate of ingress of liquid into the chamber 3, and thus minimize or wholly prevent vibration of the indicator due to shocks and motions to which the liquid in the fuel tank is subjected when an automobile is moving over rough roads. When this restricted opening is formed by means of a groove in plug 5, as shown, the mere removal of this plug discloses whether the opening is free from any obstruction.

It will be understood that the opening in the bottom of the auxiliary container 2 is larger than the opening through which this container communicates with the reservoir 1, in order that the liquid may drain freely from the chamber 3 when the plug 5 is removed. The length of the unthreaded portion of the plug is such that when it is being inserted, the drain opening into the chamber 3 is closed before the drain opening in the auxiliary container 2 is entirely closed.

By placing the liquid receiving opening of the chamber 3 below the level of the bottom of the reservoir 1 the emptying of this reservoir leaves liquid in the area of communication between the reservoir and the air chamber, and thus the diaphragm is normally subjected to a pressure in addition to the pressure due to the depth of the liquid in the reservoir, and, being thereby kept in tension, immediately responds to any added pressure. Thus a variation of an inch, for example, in the level of liquid in the reservoir 1, when this reservoir is nearly empty, will be as freely registered by the motion of the diaphragm as a variation of a like amount when the liquid in the reservoir 1 is of greater depth.

Having fully described our invention, what we claim as new and desire to secure by Letters Patent of the United States is:

1. In apparatus of the class described, the combination of a liquid container, a pressure registering device comprising a flexible diaphragm, a gas confining conduit for transmitting pressure to the diaphragm varying with the depth of liquid in the container, and means forming a liquid passage connecting the bottom of the container to a portion of the gas confining conduit at a point below the level of the bottom of the container whereby the diaphragm will be subjected to a pressure in excess of that due to the liquid in the tank.

2. In apparatus of the class described the combination with a main liquid container, of an auxiliary liquid container communicating with the main container, means forming an air chamber communicating at its lower part with the lower part of the auxiliary container, pressure indicating means connected with the air chamber, and means for draining liquid from the air chamber without disturbing the connections with the pressure indicating means or the main container.

3. In apparatus of the class described the combination with a main liquid container, of an auxiliary liquid container communicating with the main container and having its lower part beneath the level of the bottom of said main container, an air chamber communicating with the lower part of the auxiliary container, and pressure indicating means connected with the air chamber.

4. In apparatus of the class described the combination with a main liquid container, of an attachment for said container comprising means forming a liquid receiving chamber and an air chamber communicating therewith, said liquid receiving chamber and air chamber being both provided with drain openings at the lower parts thereof, and single means for closing the drain opening of the liquid receiving chamber and restricting the drain opening of the air chamber.

5. In apparatus of the class described the combination with a main liquid container, of an attachment for said container comprising means forming a liquid receiving chamber and an air chamber communicating therewith, said liquid receiving chamber and air chamber being both provided with drain openings at the lower parts thereof.

6. In apparatus of the class described the combination of a main liquid container, an attachment for said container comprising means forming a liquid receiving chamber and an air chamber, said liquid receiving chamber and air chamber being both provided with drain openings at the bottoms thereof, and a single plug for both of said openings, said plug being provided with a passage whereby the liquid may enter the air chamber from the liquid receiving chamber when said plug is in normal position.

7. In apparatus of the class described the combination of a main liquid container, an attachment for said container comprising means forming a liquid receiving chamber and an air chamber, said liquid receiving chamber and air chamber being both provided with drain openings at the bottoms thereof, and a single plug for both of said openings.

8. In apparatus of the class described, the combination of a main liquid container, resilient pressure responsive means for registering the depth of liquid in said container, a gas confining conduit for transmitting to said pressure responsive means a pressure varying with the depth of said liquid, and means for applying a pressure to the confined gas in excess of that produced by the liquid in the container.

9. In apparatus of the class described, the combination of a main liquid container, an auxiliary liquid container communicating with the main container, an air chamber communicating with the auxiliary container at a point beneath the level of the bottom of the main container, and pressure indicating means connected with the air chamber.

10. In apparatus of the class described, the combination of a liquid container and an air chamber communicating therewith, said container and air chamber being both provided with drain openings, and single drain plug for both of said openings.

11. In apparatus of the class described, the combination of a liquid container and an air chamber communicating therewith, said container and air chamber being both provided with drain openings, and a single drain plug for said openings, said plug being adapted to restrict the drain opening into the air chamber before closing the other drain opening.

In testimony whereof, we have hereunto set our hands and affixed our seals.

EDWIN E. HUFFMAN. [L. S.]
ORPH W. COWGILL. [L. S.]